United States Patent [19]

Kupf et al.

[11] 4,131,411

[45] Dec. 26, 1978

[54] ARRANGEMENT FOR MANUFACTURE OF VOLUMINOUS PRODUCTS MADE OF PLASTICS

[75] Inventors: Lubomir Kupf, Praha; Vladimir Kos, Luzna, both of Czechoslovakia

[73] Assignee: Statni vyzkumny ustav materialu, Prague, Czechoslovakia

[21] Appl. No.: 779,499

[22] Filed: Mar. 21, 1977

[51] Int. Cl.² ............................................... B29F 1/04
[52] U.S. Cl. .................... 425/559; 425/557; 425/567
[58] Field of Search ............... 425/557, 558, 559, 560, 425/569, 567, 574, 145, 585, 586

[56] References Cited

U.S. PATENT DOCUMENTS

| | | | |
|---|---|---|---|
| 2,478,013 | 8/1949 | Roddy | 425/557 X |
| 3,162,703 | 12/1964 | Eyles | 425/567 X |
| 3,233,288 | 2/1966 | Strauss | 425/190 |
| 3,247,304 | 4/1966 | Ninneman | 425/558 X |
| 3,555,617 | 1/1971 | Wessel et al. | 425/567 X |
| 3,611,503 | 10/1971 | Blumer | 425/585 |
| 3,674,401 | 7/1972 | Annis et al. | 425/567 |
| 3,819,313 | 6/1974 | Josephsen et al. | 425/560 |
| 3,891,372 | 6/1975 | Takiura | 425/567 X |

Primary Examiner—Francis S. Husar
Assistant Examiner—William R. Briggs
Attorney, Agent, or Firm—Burgess, Ryan and Wayne

[57] ABSTRACT

Voluminous products of plastics are made by providing between a filling cylinder of the injection part and the mould a transfer chamber with a piston, the axis of which does not coincide with the axis of the filling cylinder.

3 Claims, 3 Drawing Figures

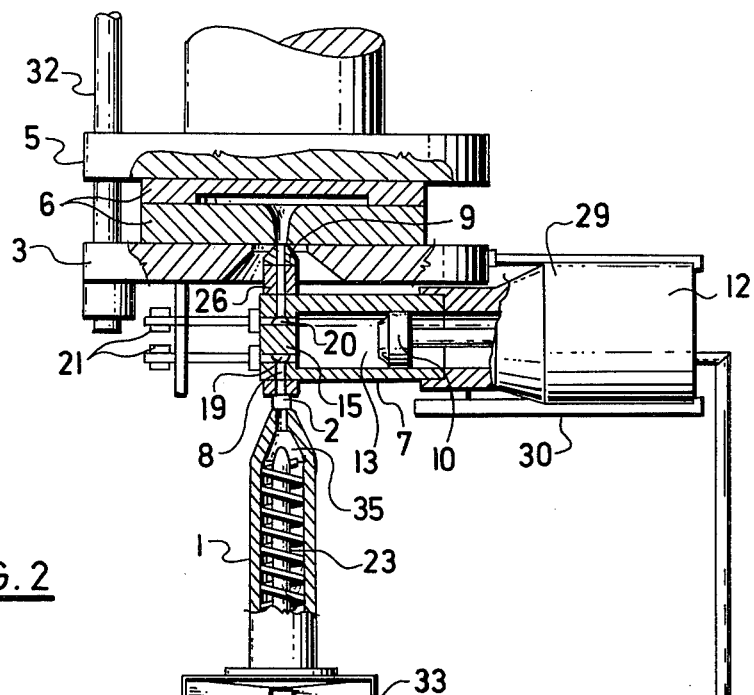
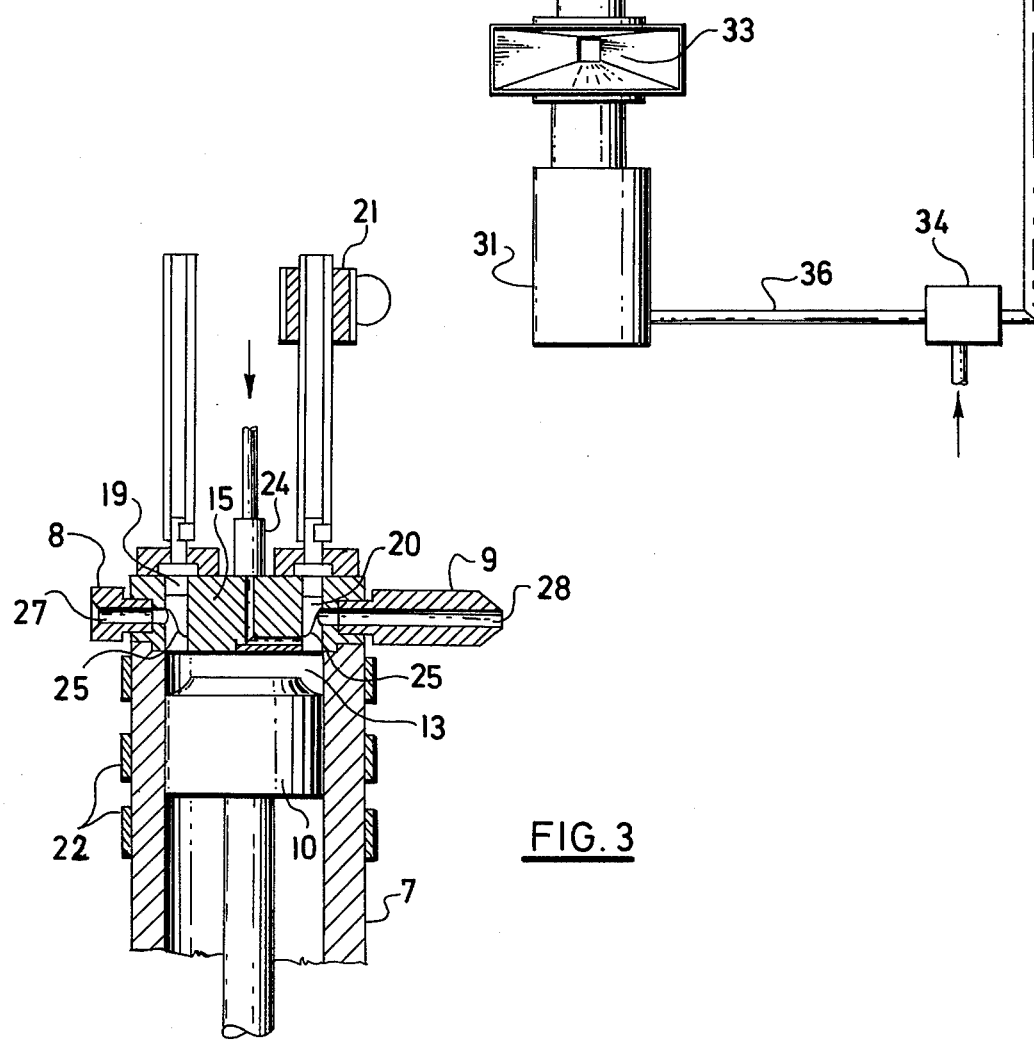
FIG. 2
FIG. 3

ARRANGEMENT FOR MANUFACTURE OF VOLUMINOUS PRODUCTS MADE OF PLASTICS

BACKGROUND OF THE INVENTION

The invention relates to an arrangement for manufacture of voluminous products made of plastics and of rubber compounds.

For injection of structural foam, i.e. of plastics with expansive character, which provide in a mould an integral moulding with a porous core and a compact surface, a number of particular manufacturing processes and especially adjusted arrangements are used at present. The expansion of the melt is achieved by a foaming agent introduced into the mould together with the melt. The foaming agent can be some material decomposing at elevated temperature, for instance azodicarbonamide and similar or compressed gas, for instance nitrogen.

The thus prepared melt is injected into the mould at elevated speed either by means of a piston from a storage chamber after its filling by a plastic injecting worm or directly by an axial motion of the face of the plastic injecting worm from the plastic injecting chamber.

Arrangements for injection of the material from a storage chamber have this chamber situated so that the motion of the piston is either parallel, concurrent or perpendicular to the axis of the mould, which itself is perpendicular to clamping plates. In case the injection is carried out perpendicularly to the axis of the mould, the chamber terminates advantageously in a nozzle parallel with the axis of the mould and bearing against a lateral wall of the mould. The mould is in direction of its partition plane provided with an inlet, whereby the melt proceeds from one side of the hollow space to the other. This arrangement and process are used in case of a perpendicular arrangement of the injection unit to one or more closures, for instance at a closure with a vertical axis, where the surface of the extension is horizontal and the injection is carried out from the lateral side of the press. Another arrangement has an outlet situated in the axis of the chamber.

The outlet is at its end forked so that both its ends fill the mould in the direction of its axis. Universal arrangements for injection of structural foam and classical plastics are solved so that a hydraulic accumulator with the respective distributing means is connected to currently manufactured classical machines. By this arrangement the original high injection pressure is maintained and the speed of the injection i.e. the motion of the worm is increased, but the maximum volume which could be originally injected is not increased.

The described known arrangements using a chamber with an injection piston are designed solely for injection by low pressure technology as their chambers are designed for low injection pressures and larger volumes. The chambers are also, when compared with arrangements for injection of classical homogenous extensions, connected to closing units with low closing forces and weak posts.

With current arrangements for high pressure injection of classical materials also with foaming agents, operating at high speed and pressure, the magnitude of extrusions is limited solely by the capacity of the injection unit. The magnitude of these extrusions is equal to current extrusions of classical materials.

Due to the diversity of molded articles, particularly of their weight and dimensions, the full size of clamping plates and the available opening of the molding machine, molding machines cannot be fully utilized to accommodate a wide variation of molding requirements. The installation of single purpose machines is frequently not economical, and the machines cannot be fully utilized.

Where rapid setup for low cost manufacture of structural plastic foams with large extrusion volume must be placed in current manufacture, great difficulties are presently experienced due to time lags and particularly due to impractically high costs involved therein.

A substantial drawback of known arrangements is that for extrusions of not foamed materials the manufacture of larger products surpassing the capacity of the machine is impossible.

The manufacture of two component sandwich products by injection with a compact surface layer and a foamed core is at present limited to special macnhines with two injection units.

The actually used injection units beyond the proper closing unit as an additional device requires due to its length and weight large spaces in order that the injection nozzle could reach the circumference of the mould.

Low pressure injection units for structural foams which enable a manufacture of products of large size cannot be used for high pressure injection of foamed material as they do not enable extrusions with smooth surfaces.

The individual described arrangements of machines have the following characteristic features limiting their universal technological application.

at constructions of closures for low closing forces a limitation for low injection pressures;

at two component injection, complicated injection units both from the point of view of hydraulic circuitry and of electrical control circuits and availability of space;

at solutions with an additional injection chamber with a piston, this chamber is provided instead of the original plastic injecting worm injection cylinder, which is removed to another place and in construction adapted as a simple plastic injecting worm cylinder without an axial motion of the worm.

if the original construction of the injection unit with the plastic injecting worm cylinder in the axis of the mould is retained, this plastic injecting cylinder has no worm with an axial motion and the injection cylinder with a piston controlled by a hydraulic cylinder has its proper drive and control, whereby the plastic injecting cylinder and the injection mould are connected via some special distributing means.

SUMMARY OF THE INVENTION

It is an object of this invention to provide an arrangement for manufacture of voluminous products made of plastics with or without foaming agents, which would enable full utilization of the size of clamping plates and of the maximum opening of the machine. It is another object of this invention to provide an arrangement for manufacture of voluminous products made of plastics, which could be easily adjusted for different technological processes.

The arrangement according to this invention for manufacture of voluminous products made of plastics or of rubber compositions comprises an injection part and a closing part with a space for the mould. The filling cylinder of the injection part and the mould are interconnected by a transfer chamber with a piston, the axis of which transfer chamber does not coincide with the axis of the filling cylinder, whereby the power cylinder of the injection part is interconnected with the power cylinder of the transfer chamber by a common hydraulic circuit. The transfer chamber is situated within a bridged, fixed on a stable clamping plate and can be also fixed on the frame and is connected over a nozzle and a connecting element by an opening in the clamping plate with the mould. According to another feature of the invention the power cylinder of the tranfer chamber can be directly connected over a conduit of the hydraulic circuit with the power cylinder of the injection part, whereby a chamber for the melt is created in the filling cylinder by the stroke of a worm. The axis of the filling cylinder passes furthermore through the face wall of the transfer chamber, where at least a single connecting channel and at least a single transfer channel are provided connected to the filling cylinder, whereby the face wall of the transfer chamber is situated beyond the axis of the stable clamping plate and of the mobile clamping plate. A connecting element provided with a discharge nozzle controlled by a closing and throttling valve is connected behind the discharge opening of a connecting channel. At least one inlet for modifying components into the melt is arranged in the face wall of the transfer chamber. The face wall of the transfer chamber is for rectification of the flow and for dosing of the melt provided with a fashioned inlet valve and with at least one discharge valve, in the body of which a recess is arranged. The transfer chamber is provided with a resilient support, independent on a resilient support of the connecting element and of the discharge tube adapted for compensation of a possible axial misalignment due for instance by dilatation caused by stress or by heat when pressing the discharge tube by the filling cylinder against the mould. According to still another feature three posts are provided for closing the mould situated at three corners of the tetragonal clamping plates. In all mentioned cases the injection arrangement can be provided in the injection part with a twin chamber feeding means for subsequent dosing of two kinds of plastics to the worm.

The arrangement according to this invention enables a high grade and economically advantageous injection of voluminous products from plastics with different modifications of injection technology.

At a full utilization of the parameters of the machines, i.e. particularly of the size of clamping plates, of the maximum opening of the machine, of the closing force, and of the melting capacity and output of the machine it is possible to achieve several times larger products in their dimensions, volume and weight. These advantages are not only achieved using the technology of injection of polymer melts without foaming agents, but also for different modifications in technology and in materials. This particularly holds true about modifications in materails by adding foaming agents to the chips in the feeding means of the machine or already contained in the chips or about a continuous addition of gases, for instance of nitrogen into the melt within the space of the face wall of the transfer chamber and of the connecting element.

The constructional arrangement according to this invention as a universal injection machine enables a number of modifications of the fundamental technology of injection of foamed plastics and of the technology of injection without foaming agents where the main parameters of the arrangement are utilized to a maximum. Using the technology of injection with a foaming agent several times increased volume, dimensions and weight of the products is achieved in addition to the mentioned advantages. A suitable constructional connection of working spaces of both injection means enables a mutually independent or dependent movement of working pistons, obtaining thereby variations of injection technology in quality and quantity, including a manufacture of sandwich designs. This concerns particularly the possibility of programming the speed of movement of pistons of the transfer chamber and of the injection cylinder, furthermore the injection of the melt of two polymer types with regulation of doses of the melt into the space of the mould, for instance a first dose of a material without foaming agent and a following dose with a foaming agent. A programming of the temperature of the melt, particularly for filling the mould with the melt by means of the discharge valve in the transfer chamber is also enabled. A combination of a low pressure and high pressure injection is furthermore made possible. The construction of channels of the transfer chamber and the construction of feeding means enables also a two colour injection.

The relatively small mass, minor pretentiousness and high adaptivity of the additional arrangement according to this invention to current injection presses enables at low costs replace fully single purpose expensive machines.

The prolongation of the operating cycle of actual presses due to a longer cooling time enables their better complex utilization and simultaneously a prolongation of their life time.

The effectiveness of the arrangement manifests itself furthermore for the manufacture by consisting of a standard injection device completed by an additional transfer chamber with a power cylinder which requires no new hydraulic control means. Thus the work with development and construction is substantially simplified.

From the point of view of requirements for changes of the melt and the flow from the worm into the mould, optimum conditions are created as the length of channels and variations of their cross section are minimal, the rinsing is perfect and no local overheating of the melt takes place.

DESCRIPTION OF DRAWINGS

Examplary embodiments of arrangements according to this invention are diagrammatically shown in the attached drawings, where FIG. 2 is a similar view of an arrangement, where the transfer chamber, which interconnects the mould with the filling cylinder, is situated in front of the stable clamping plate and is provided with a connecting element with a nozzle, FIG. 3 is a longitudinal sectional view of a transfer chamber showing details of an arrangement where the melt flows through the face wall and through an opening of the transfer chamber.

DESCRIPTION OF PREFERRED ARRANGEMENTS

Figure 1:
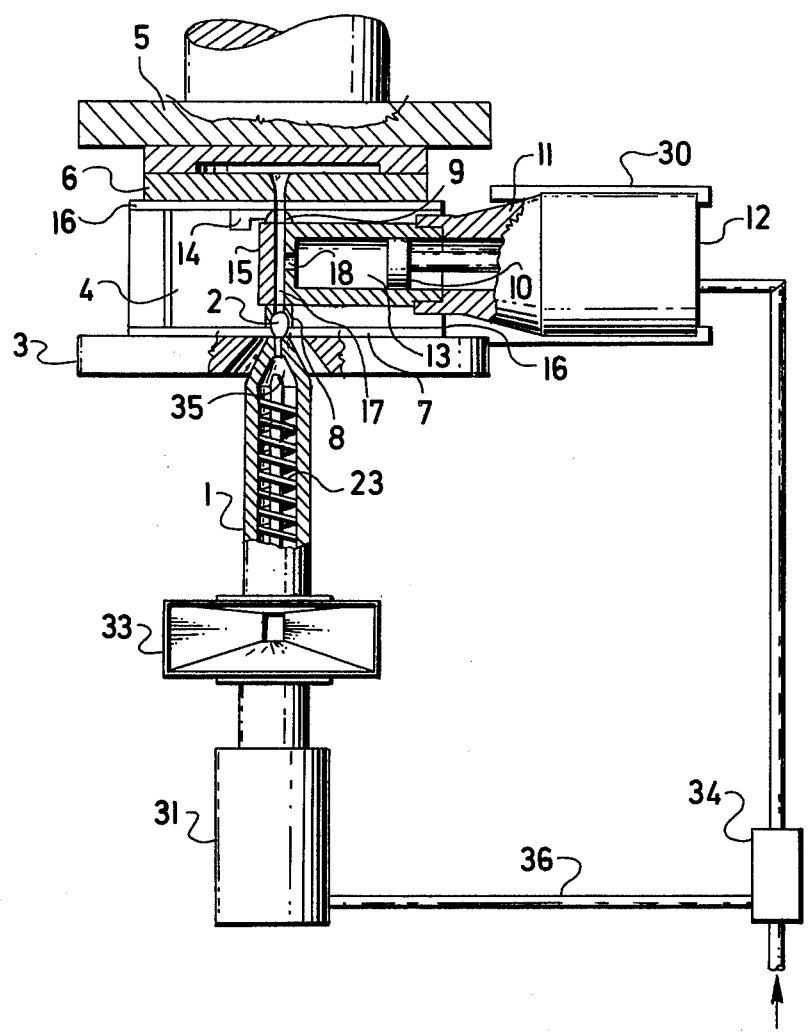
FIG. 1 is an elevation with parts in section of the whole arrangement. The transfer chamber is here situated between a stable clamping plate and the mould, and interconnects the mould with a filling cylinder.

The injection device as shown in FIG. 1 comprises a high pressure injection part, a closing part with an inserted mould 6 with a bridge 4 and a transfer chamber 7 with a power cylinder 12.

The high pressure injection part connected to the closing part of the injection device comprises a filling cylinder 1 housing a plastic injecting possibly also injection worm 23. The discharge end 2 of the filling cylinder 1 bears against an inlet nozzle 8 of the transfer chamber 7.

The closing part of the injection device with a mobile clamping plate 5 and with a stable clamping plate 3 is situated on the frame 30 of the injection device. The mould 6 resting with its clamping surface 16 against a bridge 4 is situated between the mobile clamping plate 5 and the stable clamping plate 3. The mobile clamping plate 5 is guided by posts 32 /see FIG. 2./ for clamping the mould 6. Advantageously three posts 32 are provided in three corners of tetragonal clamping plates 3 and 5.

The transfer means comprises a power cylinder 12, to which the transfer chamber 7 is fixed by a connecting element 11, the axis of the transfer chamber 7 being parallel with the stable clamping plate 3. A piston 10 is situated within the transfer chamber 7 which together with the walls of the transfer chamber 7 represents a space 13 for the melt. A throughgoing connecting channel 17 is formed in the face wall 15 of the transfer chamber 7, to which connecting channel 17 a transfer channel 18 is leading, terminating into the space 13 for the melt. The connecting channel 17 interconnects the discharge end 2 of the filling cylinder 1 over the discharge nozzle 9 of the transfer chamber 7 with the mould 6. A closing and throttle valve 14 is provided in the discharge nozzle 9; it can however, also advantageously be situated in the face wall 15 of the transfer chamber 7 in the connecting channel 17 between the transfer channel 18 and the discharge nozzle 9. The axis of the filling cylinder 1 passes through the face wall 15 of the transfer chamber 7, where the connecting channel 17 and the transfer channel 18 are terminating. A connecting element 26 is connected to the discharge opening of the connecting channel 17 toward the mould 8. The granules of the plastic material are fed to the worm 23 over feeding means 33. Both power cylinders 12 and 31 are controlled by control means 34 over hydraulic conduits 36.

In the alternative arrangement of the injection device as shown in FIG. 2 and 3 the transfer chamber 7 is situated in front of the stable clamping plate 3. This alternative requires contrary to that of FIG. 1 no bridge 4 below the mould 6. The interconnection of the transfer chamber 7 with the mould 6 requires a longer discharge nozzle 9 particularly if the injection device is designated for connection of the arrangement for not foamed material, where the stable clamping plate is substantially thicker.

The discharge end 2 of the filling cylinder 1 is connected with the mould 6 so that the melt flows from the inlet nozzle 8 of the transfer chamber 7 over the inlet valve 19 of the discharge nozzle 9 into the space 13 for the melt in the transfer chamber 7. The melt is forced therefrom by the piston 10 which is advantageously provided on its circumference with a recess (FIG. 3) enabling a passage of the melt in case the piston 10 bears on the face well 15 of the transfer chamber 7. The melt flows thereafter over the discharge valve 20 to the discharge nozzle 9. The inlet valve 19 and the discharge valve 20 are independently controlled by control elements 21. In the examplary detailed embodiment of the transfer chamber 7 both valves — the inlet valve 19 and the discharge valve 20 — are shown as rotary slide valves provided with recesses 25 enabling a perfect flowing of the liquid, the flow of which they rectify approximately for 90°. The transfer chamber 7 is provided with an external heater 22 with its proper regulation, independent of the regulation of the filling cylinder 1. A supply port 24 for dosing further modification components of the melt, for instance of gas is provided in the face wall 15 of the transfer chamber 7 in front of the discharge nozzle 9. A resilient sealing 26 is provided for the tranfer chamber 7 to enable a proper pressing of the discharge nozzle 9 by the filling cylinder 1 to the mould 6.

The arrangement according to this invention facilitates a number of working processes with plastics, both with clean polymers an copolymers and their modifications, which can be performed on this arrangement, from which an exemplary technology showing the operation of the arrangement is described in the following.

Granules of a polymer are dosed into the filling cylinder with 0.5% of foaming agent and 10% of glass fibres. The mixture is homogenized by the worm 23, which is in the front part of the filling cylinder 1. A pressure of 60 atms is in the hydraulic circuit. The melt flows over the supply channel 27 and over the inlet valve 19 of the discharge nozzle 9 into the space 13 for the melt in the transfer chamber 7 which is maintained at a constant temperature depending on the type of the applied polymer. The piston 10 in the transfer chamber 7 recedes to its rear position. After the required dose of the melt is obtained, the worm is disconnected by the valve 19.

The proper injection into the mould is accomplished by first increasing the pressure in the hydraulic circuit for instance to 150 atms and subsequently opening the discharge valve 20, enabling the melt to enter the space of the mould 6, where it is injected by the piston 10 at high speed via the inlet chamber 28. After the transfer chamber 7 has been emptied, the discharge valve 20 is immediately closed and a following cycle of plastic injecting by the worm proceeds.

In case two different materials are dosed, the material from the twin chamber feeding means 33 containing the foaming agent is first plasticated, after the required dose of the melt has been achieved in the transfer chamber, the dosing is changed over to the second material which is in a rather small amount pressed into the transfer chamber and its major part fills the chamber in front of the worm. The process of injection is the same with the difference, that first the melt in front of the worm is pressed out, followed by the melt from the transfer chamber.

We claim:

1. In an apparatus for injecting a volume of plastic melt into a mold through an inlet nozzle thereof, the improvement comprising:

a transfer unit comprising a cylindrical body having an end plate and a transfer chamber in said unit adjacent said end plate, a piston disposed in said chamber and mounted for sliding movement toward and away from said end plate, and a first hydraulic power cylinder coupled to said piston for urging said piston toward said end plate, the portion of said piston adjacent said end plate having a generally frustoconical shape with a space between the periphery of the piston end face and the adjacent chamber wall, said end plate having an inlet port, an inlet duct extending between said inlet port and said chamber, an inlet control valve in said inlet duct, an outlet port, means operatively associated with said end plate for coupling said outlet port to said inlet nozzle of said mold, an outlet duct extending between said outlet port and said chamber, and an outlet control valve in said outlet duct, said inlet and outlet control valves having actuating means operable independently of each other;

an injection unit having a hollow filling cylinder with an outlet aperture communicating with said inlet port, the longitudinal axis of said cylinder being generally aligned with said inlet nozzle of said mold, an injection worm in said cylinder for feeding fluid material to said outlet aperture, a second hydraulic power cylinder coupled to said worm; and common hydraulic means connected to said power cylinders for operating said power cylinders.

2. The arrangement as claimed in claim 1, wherein said mold has stationary and movable clamping plates, further comprising a bridge disposed between the stable clamping plate and the mold, said transfer unit being disposed within said bridge.

3. The arrangement as claimed in claim 1, further comprising at least one supply conduit for modification components to the melt provided in the end plate of the transfer unit cylindrical body.

* * * * *

UNITED STATES PATENT OFFICE
CERTIFICATE OF CORRECTION

Patent No. 4,131,411　　　　Dated December 26, 1978

Inventor(s) Lubomir Kupf, et al

It is certified that error appears in the above-identified patent and that said Letters Patent are hereby corrected as shown below:

Column 1, line 42: "is at its end forked" should be --is forked at its end--.

Column 2, line 17: "macnhines" should be --machines--.

Column 3, line 5: "bridged" should be --bridge--.

line 56: "materails" should be --materials--.

Column 5, line 64: "well" should be --wall--.

Column 6, line 11: "sealing" should be --seating--.

line 17: "an" should be --and--.

Signed and Sealed this

Tenth Day of July 1979

[SEAL]

Attest:

Attesting Officer

LUTRELLE F. PARKER
Acting Commissioner of Patents and Trademarks